Jan. 31, 1950        W. D. PEEL        2,496,019

FRUIT FEEDING AND ORIENTING MACHINE

Filed Sept. 23, 1947        2 Sheets—Sheet 1

INVENTOR
Wirt D. Peel
BY Philip A. Friedell
Attorney

INVENTOR
Wirt D Peel
BY
Philip A. Tredell
Attorney

Patented Jan. 31, 1950

2,496,019

UNITED STATES PATENT OFFICE 2,496,019

FRUIT FEEDING AND ORIENTING MACHINE

Wirt D. Peel, Oakland, Calif.

Application September 23, 1947, Serial No. 775,680

10 Claims. (Cl. 198—30)

This invention relates to improvements in feeding devices and particularly to devices for feeding fruits singly to fruit preparing and pitting machines, and orienting the fruit to enter the machine in a predetermined position, and is specifically designed for feeding elongated fruits such as prunes and dates to the seed extractor disclosed and claimed in my copending application Serial No. 771,632, filed September 2, 1947, and now Patent No. 2,485,653 granted October 25, 1949, which requires that fruits with elongated pits be fed thereto with the axes of the pits in a substantially vertical plane and that they be fed singly in perfect unison with the extractor and that in no case can more than one fruit enter the extractor at a time.

Obviously a feeder of this type may be used for many other purposes, such as for counting products or elements, for delivering products singly to packing or wrapping machines, and for feeding parts singly to other machines, such as for machining or assembly purposes.

The objects and advantages of the invention are as follows:

First, to provide a machine which will positively feed fruits singly to a fruit pitting machine or the like.

Second, to provide a machine as outlined which will coincidently orient elongated fruits to feed in a predetermined position to a machine.

Third, to provide a machine as outlined which will discard any extra fruit elements before reaching the delivery position so as to positively limit feeding to single elements.

Fourth, to provide a machine as outlined which is adjustable for fruits of different lengths and diameters.

Fifth, to provide a machine as outlined in which the feeding means is conveniently and easily replaceable to suit elements of different sizes.

Sixth, to provide a machine as outlined with vibrating means to maintain a constant flow of elements free from abrasive influences and to cause excess elements to be discarded.

Seventh, to provide a machine as outlined which is relatively simple in construction and operation, efficient, and positive in action.

In describing the invention reference will be made to the accompanying drawings, in which.

Figure 1:
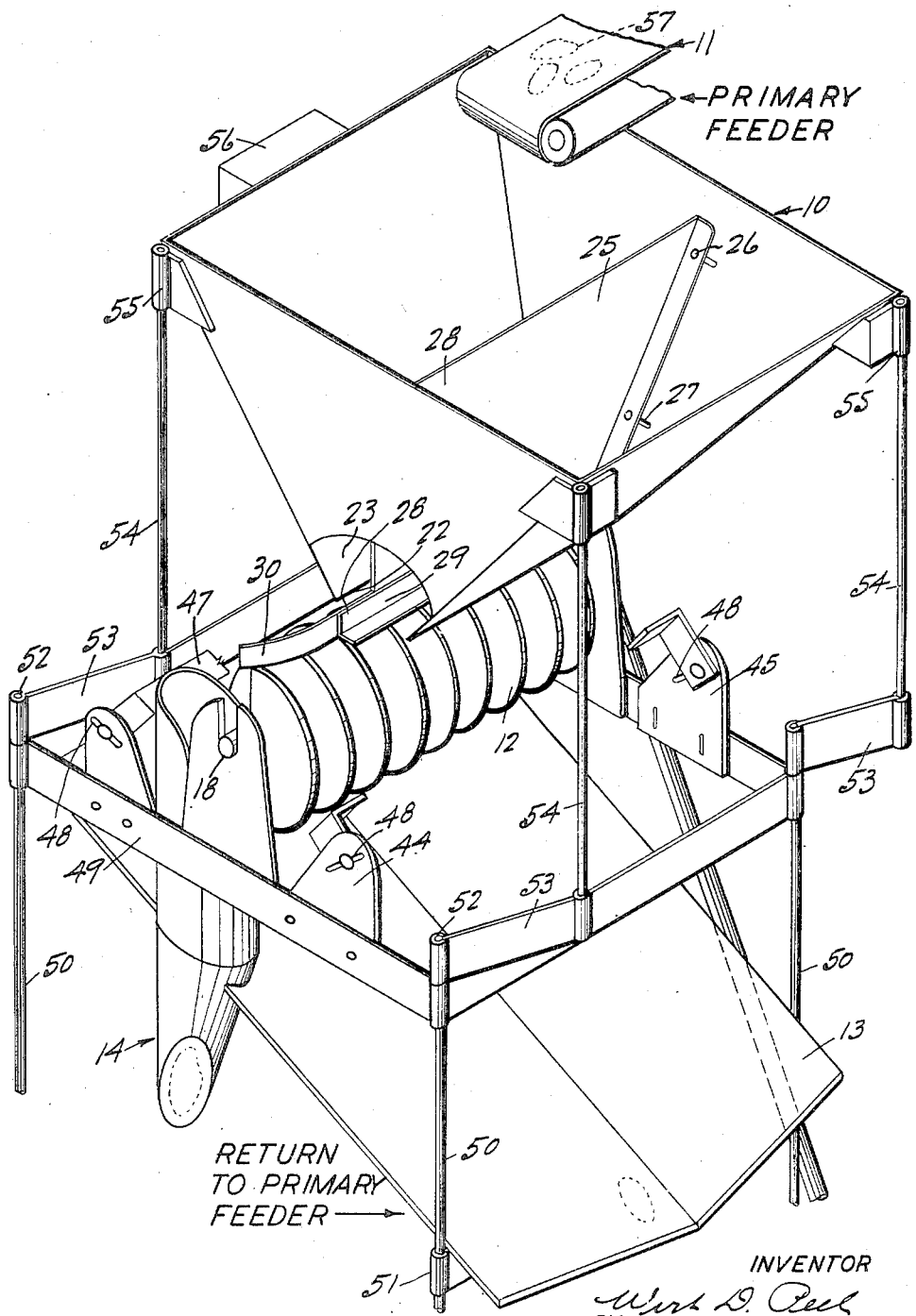
Fig. 1 is a perspective view of the invention with the locating devices removed to more clearly show the other essential structures.

The invention includes a hopper 10 which is fed by suitable primary feeding means such as a belt 11, a screw conveyor 12 including limiting and positioning means for the individual fruits, and including excess discharge means, an excess discharge chute 13 for return of excess fruits to the primary feeding means 11, a delivery chute 14 for delivering the individual fruits to the pitting or other machine 15, and a vibrator for keeping the entire machine in a state of constant vibration so as to eliminate any possibility of hang-up of fruits and prevent marring of the fruit.

The feed mechanism consists of a screw 12 in which the pitch 16 of the thread is slightly greater than the average diameter of the fruit 17, and the depth equal to the pitch so that only one fruit will fit between the threads, and this screw is supported at its opposite ends in the slot-type bearings 18 and 19 so that the screw is quickly and easily replaceable by other screws to suit the specific size of product to be fed, and this screw is driven by suitable means such as the bevel gear 20 driven by the driving means for the pitting machine 15. The delivery end of the screw is deeply concaved, at least back to the axis of the screw as indicated at 21 so that the individual fruits will tip directly over an edge into the delivery chute 14 instead of being carried around with the screw, thus providing a quick, free drop into the chute and with the major axis of the fruit in a vertical plane.

The hopper 10 is of conventional shape with inwardly sloping front and back walls and is open throughout the length of the bottom as indicated at 22 and has an arched opening 23 at the delivery end to pass excess fruits so that they will not be dragged and abraded against the forward end of the hopper, all excess fruits being carried through this opening on top of the fruits which are in the intervening spaces between the threads, and on the threads as indicated at 24. Mounted within the hopper is a combination deflector and gauge 25 which is secured only at the back as indicated at 26 and adjustable at the lower end as indicated at 27, the forward end 28 being free to vibrate, and the deflector terminating at the lower end in a gauge 29 which is adjusted to allow only one fruit to enter the interstices between the threads, the edge 22 of the hopper functioning as the spacer for the gauge, the space between the edge of the hopper opening and the gauge being slightly greater than the diameter of the fruit. A discard finger 30 extends forwardly from this gauge and is curved away from the direction of travel of the screw to brush overlying fruit off the screw before it reaches the delivery chute.

Figures 2, 3:
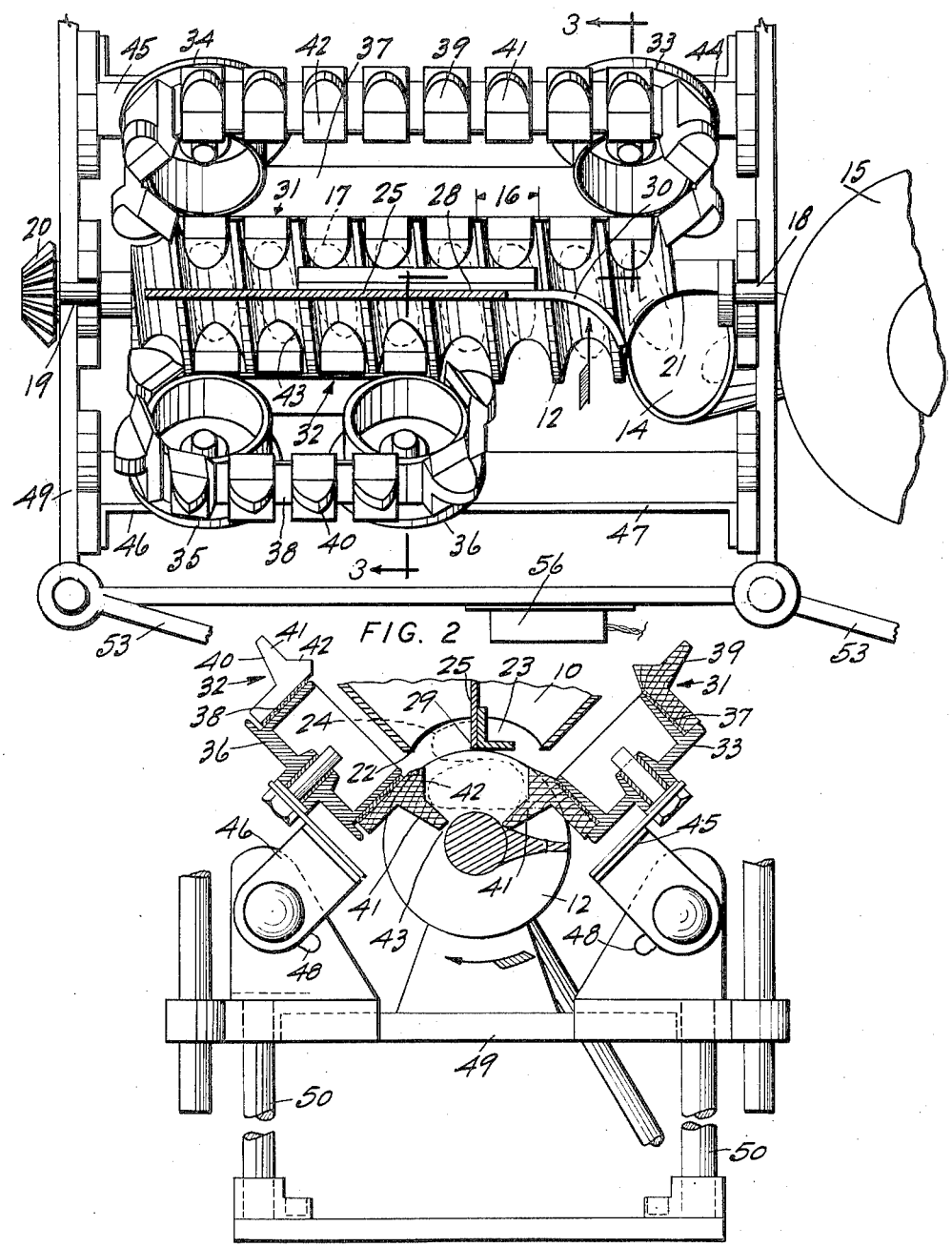
Fig. 2 is a top plan view of the invention.
Fig. 3 is a section taken on line 3—3 of Fig. 2.

Inclinably mounted and adjustable as to inclination are the traveling gauges 31 and 32 each of which includes a pair of spaced sheaves respectively 33—34 and 35—36 and a flexible belt respectively 37 and 38, and each belt is provided with teeth respectively 39 and 40 which are of the same pitch as the screw and operate in the spaces between the threads and are therefore driven by the screw with the inner strands moving in the same direction and in the direction of advance of the threads, the teeth quite closely fitting within the spaces, and each tooth including a support element 41 and gauge element 42, the support elements extending inwardly to the hub of the screw as indicated at 43 and the gauge elements being adjusted to the maximum length of the fruit to center the fruit within the spaces as is clearly illustrated in Fig. 3, the sheaves being rotatably mounted on the respective brackets 44, 45, 46 and 47, and these brackets being adjustable as indicated at 48 to permit suitable adjustment of these teeth to suit the various sizes of fruits.

Mounted beneath the conveyor is a discard chute 13 onto which the excess fruits drop to be returned to the primary feeder for return to the feed hopper.

The feed mechanism is mounted on a frame 49 which is mounted on slightly resilient though relatively rigid legs 50, and this frame and legs also carries the discard chute 13 the lower end of which is supported on the legs as indicated at 51.

Mounted on the upper ends of the legs, on the portions 52 which project above the frame 49, are arms 53 in the ends of which are mounted legs 54 for supporting the hopper as indicated at 55, and mounted on the hopper is an electromagnetic vibrator 56, the entire structure being rather resiliently supported to obtain the full effect of the vibrator.

The operation of the invention is as follows: The gear 20 is driven in unison with, and by the same driving means for the machine or device to which the individual elements are to be delivered, such as dates to be delivered to the seed extractor 15, and the vibrator is operating at the cyclic speed of the current energizing the vibrator, such as 60 cycles per second for a 60 cycle current.

The dates 57 are fed into the hopper 10 by the conveyor 11 at a rate slightly greater than the rate of delivery so that there is always an excess of dates in the hopper for delivery to the screw.

The gauge 29 is adjusted relative to the edge 22 of the hopper to just pass a single date into the screw, and the gauges 42 are adjusted to the length of the date so that only one date can enter a space between threads.

The date upon entering is maintained on top of the screw in the instant position by the traveling teeth 39 and 40 which merely hold the date in a specific position on top of the core of the screw, the teeth following clear through to the delivery chute on one side, and terminating on the other side of the screw previous to reaching the chute and immediately after reaching the forward end of the hopper.

All excess dates will travel along on top of the gauged dates and the threads and pass through the opening 23, eventually reaching the wipe-off finger 30 which aided by vibration urges the date over the follow side of the screw to drop down onto the chute 13, while those in the spaces between the threads are carried forward toward the delivery chute, being maintained in their position by the friction of the screw walls which holds the fruit against the gauge members 40 on the opposite from the discharge side, eventually reaching the cut-away section at 21, and dropping over the edge in a vertical position into the delivery chute. It will be noted that this entire unit is vibrating constantly at high speed so that the fruit is vibrated into its various positions instead of being forced or rubbed, thus avoiding any damage or marring of the fruit. All fruit which is in excess of the acceptance of the screw is carried through the opening 23 and discarded to the chute 13 from which it is transferred back to the primary feeder 11 for re-delivery to the hopper.

I claim:

1. Feeding means for feeding individual fruits, comprising: a screw having a pitch slightly in excess of the diameter of the individual fruits and a depth substantially equal to said diameter, and a superposed hopper discharging into the top side of said screw, means for admitting only a single fruit into each of the individual spaces between the threads, primary feeding means for feeding fruits to said hopper in slight excess over the acceptance of said screw, means for maintaining the individual fruits on the top side of said screw and traveling therewith, with excess fruits traveling on top of the single fruits and on the threads, and a chute for receiving single fruits as discharged from the end portion of the screw, and means for discarding the excess fruits previous to reaching said chute, and means for driving said screw; said screw having the end portion recessed back to the axis on one side for tipping the fruit into said chute for delivery in a position with the axis of the fruit substantially vertical.

2. A structure as defined in claim 1; said hopper including an opening in the bottom and a combination deflector and gauge with said deflector and gauge adjustable to compensate for fruits of different diameters to limit delivery to the screw of single fruits.

3. Feeding means for feeding individual fruits, comprising: a screw having a pitch slightly in excess of the diameter of the individual fruits and a depth substantially equal to said diameter, and a superposed hopper discharging into the top side of said screw, means for admitting only a single fruit into each of the individual spaces between the threads, primary feeding means for feeding fruits to said hopper in slight excess over the acceptance of said screw, means for maintaining the individual fruits on the top side of said screw and traveling therewith, with excess fruits traveling on top of the single fruits and on the threads, and a chute for receiving single fruits as discharged from the end portion of the screw, and means for discarding the excess fruits previous to reaching said chute, and means for driving said screw; said means for maintaining the individual fruits comprising spaced sheaves for each side of the screw, belts operating about said sheaves and having teeth fitting in the spaces between the threads and driven through cooperation with the threads and each including a supporting and gauging member for supporting and gauging the ends of the fruits, with the teeth on the resistance side of the screw extending throughout the length of the screw and those on the opposite side terminating in spaced relation to the chute with said means for discarding located between the terminal tooth and the chute for discard of excess fruits before reaching said chute.

4. Feeding means for single fruits comprising, a hopper having an opening in the bottom, and a screw in receiving relation to said bottom and having a pitch and depth of thread slightly in excess of the diameter of the fruits to receive a single fruit, and driving means for said screw; primary feeding means for feeding fruits slightly in excess of the acceptance of said screw; means adjustable for limiting entry of fruits to said screw to single fruits, and gauge means for maintaining said single fruits in the topmost positions in said screw and traveling with and driven by said screw, a chute for receiving said fruits from the end of the screw, and discarding means for discarding all fruits in excess of said acceptance previous to reaching said chute, and vibrating means for vibrating said feeding means to cause relatively free feeding of the fruits.

5. A structure as defined in claim 4; said means adjustable for limiting entry of fruits to single fruits comprising one longitudinal edge of the bottom opening in the hopper, and a deflector located in said hopper and terminating at the lower end in a gauge member adjustable relative to said longitudinal edge to pass only a single fruit therebetween.

6. A structure as defined in claim 5; said gauge means comprising spaced sheaves for each side of the screw and belts operating over said spaced sheaves and having teeth of the same pitch as that of the screw and fitting between the threads and comprising each a support portion for supporting one end of the fruit and an upwardly projecting portion to gauge and position the end of the fruit.

7. A structure as defined in claim 6; the delivery end of said screw being recessed back to the axis of the screw to cause the fruits to drop abruptly and with the axis vertical into the chute.

8. A structure as defined in claim 7; said discarding means comprising a passage in the forward end of the hopper to pass fruits riding on top of the single fruits and threads, and a finger extending beyond the hopper and being curved to deflect the excess fruits off the single fruits and threads for return to the primary feeder previous to reaching said chute.

9. A structure as defined in claim 8; a relatively resilient mounting for said feeding means including said hopper, with said vibrating means mounted on said hopper for vibrating the hopper.

10. Individual feeding means comprising; a screw supported on a horizontal axis and having interstices between threads to freely receive a single element; means for feeding elements to the top side of the screw and limiting feeding to a single element for each interstice; means for maintaining the top-side position of each element throughout the travel of the screw; a chute for receiving the individual elements from the terminal end of the screw and means for rotating said screw; said individual feeding means being relatively resiliently supported and including vibrating means; primary feeding means for feeding elements in excess of the acceptance of said screw, with excess elements traveling on top of the elements in the interstices, and means for discarding said excess elements for return to the primary feeding means previous to reaching said chute; said means for maintaining the top-side position comprising spaced sheaves adjustably mounted, and a sheave supported belt for each side of the screw and including teeth mounted on each belt and fitting the interstices and traveling therewith and comprising gauge members for gauging the elements lengthwise; adjustment of said sheaves causing adjustment of said teeth to vary the spacing between the gauge members to accommodate elements of selected lengths.

WIRT D. PEEL.

REFERENCES CITED

The following references are of record in the file of this patent:

UNITED STATES PATENTS

| Number | Name | Date |
|---|---|---|
| 731,828 | White | June 23, 1903 |
| 1,324,930 | Schaffer | Dec. 16, 1919 |
| 2,377,431 | Lakso | June 5, 1945 |